(12) United States Patent
Eguchi

(10) Patent No.: US 9,172,689 B2
(45) Date of Patent: Oct. 27, 2015

(54) IMAGE PROCESSING APPARATUS, METHOD OF CONTROLLING THE SAME AND STORAGE MEDIUM THEREOF

(71) Applicant: CANON KABUSHIKI KAISHA, Tokyo (JP)

(72) Inventor: Kimimori Eguchi, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 13/916,314

(22) Filed: Jun. 12, 2013

(65) Prior Publication Data
US 2014/0055805 A1  Feb. 27, 2014

(30) Foreign Application Priority Data
Aug. 23, 2012  (JP) ................. 2012-184574

(51) Int. Cl.
G06K 15/00 (2006.01)
G06F 3/12 (2006.01)
H04L 29/06 (2006.01)
G06Q 50/00 (2012.01)
G06Q 10/10 (2012.01)

(52) U.S. Cl.
CPC .............. *H04L 63/08* (2013.01); *G06F 3/1204* (2013.01); *G06F 3/129* (2013.01); *G06F 3/1268* (2013.01); *G06F 3/1292* (2013.01); *G06Q 10/107* (2013.01); *G06Q 50/01* (2013.01)

(58) Field of Classification Search
CPC ..... H04L 63/08; G06F 3/1204; G06F 3/1268; G06F 3/129; G06F 3/1292; G06Q 10/107; G06Q 50/01
See application file for complete search history.

(56) References Cited

U.S. PATENT DOCUMENTS

| | | | |
|---|---|---|---|
| 2005/0168772 A1* | 8/2005 | Kim ............................. | 358/1.15 |
| 2009/0164596 A1* | 6/2009 | Sakiyama ..................... | 709/206 |
| 2011/0276925 A1* | 11/2011 | Tumanov et al. ............. | 715/856 |
| 2012/0250066 A1* | 10/2012 | Kikumoto et al. ........... | 358/1.14 |
| 2013/0215460 A1 | 8/2013 | Eguchi | |

FOREIGN PATENT DOCUMENTS

JP  2011-129009 A  6/2011

OTHER PUBLICATIONS

Aditya Patawari, "Controlling Your Linux Server Using Twitter" Dec. 4, 2011 http://blog .adityapatawari.com/2011/12/controlling-you r-linux-server-using, html.*
U.S. Appl. No. 13/911,883, filed Jun. 6, 2013 Applicant: Kimimori Eguchi.

* cited by examiner

*Primary Examiner* — Fred Guillermety
*Assistant Examiner* — Henok A Shiferaw
(74) *Attorney, Agent, or Firm* — Fitzpatrick, Cella, Harper & Scinto

(57) ABSTRACT

An image processing apparatus that communicates with a server that has a microblogging function performs user authentication processing and follows a user authenticated by the user authentication processing in accordance with the performing user authentication processing succeeding.

9 Claims, 17 Drawing Sheets

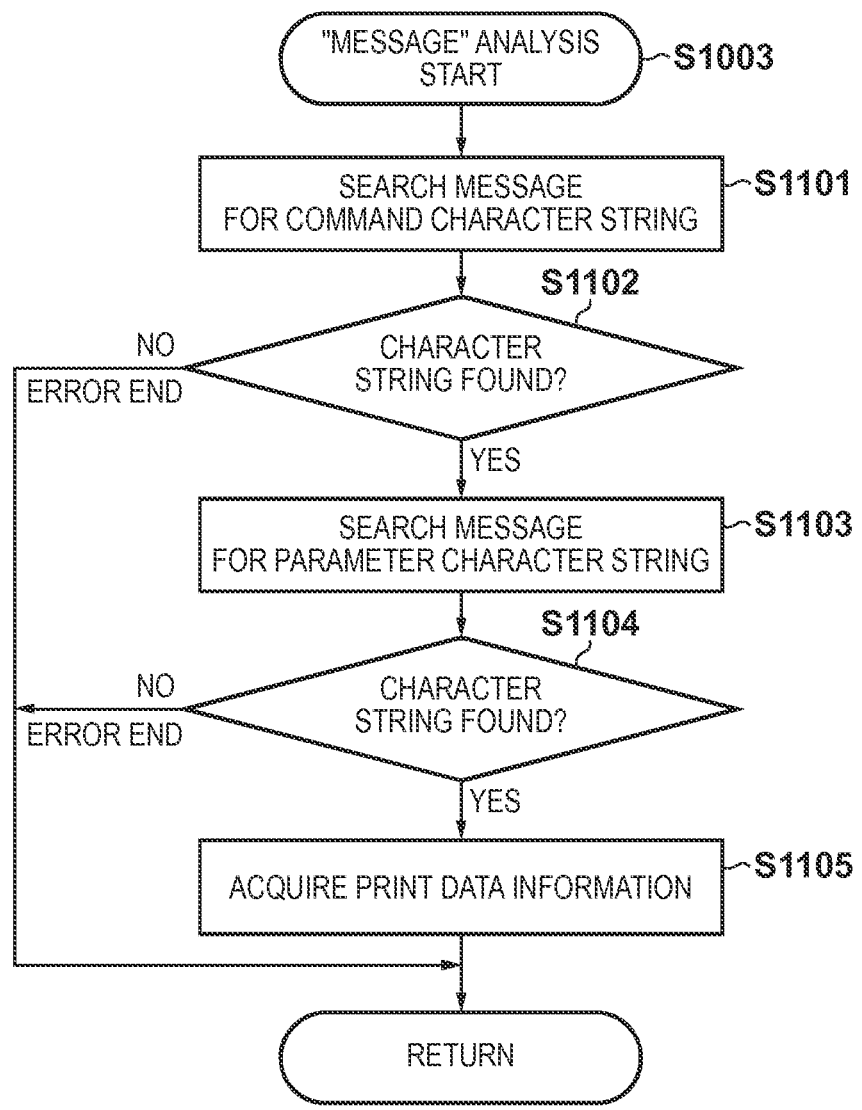

FIG. 12

| PRINT ID | PRINT NAME | USER ID |
|---|---|---|
| 0001 | PROJECT_Y-DISTRIBUTION_DOCUMENT_Ver01 | 15304 |
| 0002 | PROJECT_Y_RESOURCE_MANAGEMENT | 91024 |
| 0003 | PROJECT_Y_SCHEDULE_MANAGEMENT | 32425 |
| 0004 | MINUTES_0315 | 12534 |

FIG. 13A

| COMMAND CHARACTER STRING | PROCESSING FUNCTION |
|---|---|
| SEND | SEND FUNCTION |
| PRINT | PRINT FUNCTION |
| COPY | COPY FUNCTION |
| SEND COMPLETION | SEND FUNCTION COMPLETION |
| PRINT COMPLETION | PRINT FUNCTION COMPLETION |
| COPY COMPLETION | COPY FUNCTION COMPLETION |
| SEND CANCEL | SEND FUNCTION CANCEL |
| PRINT CANCEL | PRINT FUNCTION CANCEL |
| COPY CANCEL | COPY FUNCTION CANCEL |
| PRINT PREPARATION | PRINT PREPARATION |

FIG. 13B

| PARAMETER CHARACTER STRING | PROCESSING FUNCTION |
|---|---|
| COPIES | COPIES PROCESSING |
| BLACK AND WHITE | BLACK AND WHITE PROCESSING |
| COLOR | COLOR PROCESSING |
| FILE | ACQUIRE FROM STORAGE DESTINATION |

F I G. 14
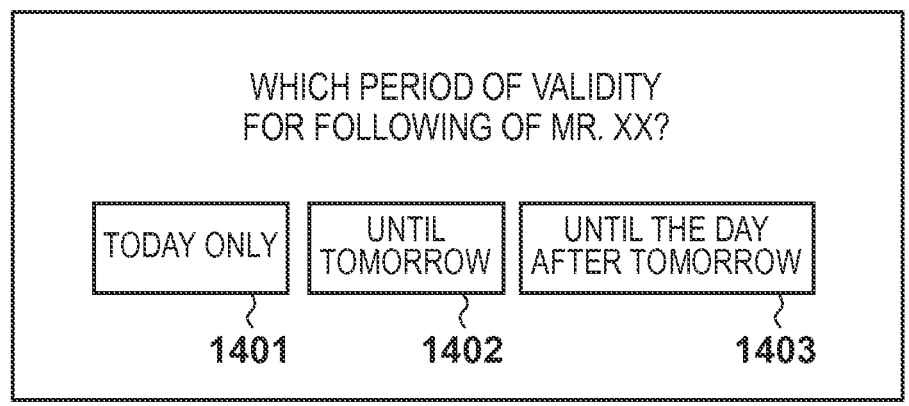
F I G. 15
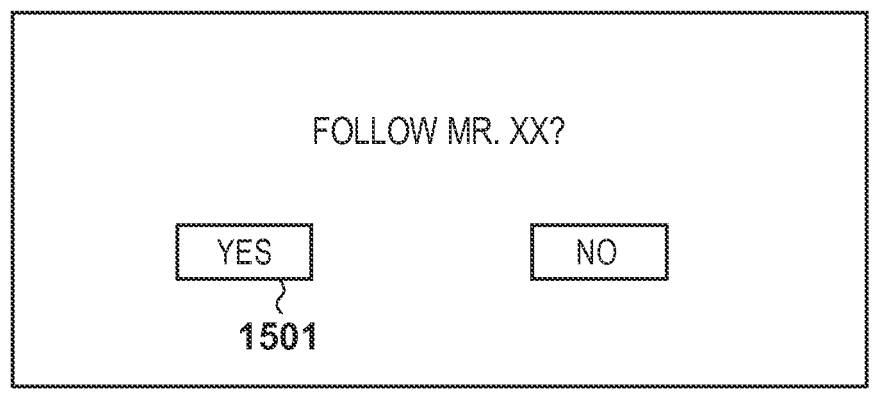

F I G. 19A

| IMAGE FORMING APPARATUS NAME | FOLLOW PRECEDENCE ORDER |
|---|---|
| IMAGE FORMING APPARATUS A | 2 |
| IMAGE FORMING APPARATUS B | 1 |

F I G. 19B

| IMAGE FORMING APPARATUS NAME | FOLLOW PRECEDENCE ORDER |
|---|---|
| IMAGE FORMING APPARATUS A | 3 |
| IMAGE FORMING APPARATUS B | 2 |
| IMAGE FORMING APPARATUS C | 1 |

IMAGE PROCESSING APPARATUS, METHOD OF CONTROLLING THE SAME AND STORAGE MEDIUM THEREOF

BACKGROUND OF THE INVENTION

1. Field of the Invention

The present invention relates to a technique in which a microblogging function provided by a service providing server is used by communicating with the server via a network.

2. Description of the Related Art

In recent years, there are services that provide a microblogging function as a communication tool. This microblogging function is a type of blog function by which a user holding an account posts short sentences called "microposts" as "messages" or "comments" to the service. Here the user may include, for example, an image forming apparatus itself, a linking service, an object on a cloud service or an application, and is not limited to an actually user (human). A unique identifier is assigned to each "message" and "comment" that a user posts or transmits. In the microblogging function, communication is carried out via a "timeline" or "following". Here the "timeline" is a user specific Web page that registers, displays and manages, as a list, "comments" related to a registered "message", when a user registers a "message". Here, the user that registered the "message" and other users perform communication by exchanging information by registering information related to the message as "comments" on the "timeline".

Also, "following" is registering with another user so as to be able to display on one's own Web page a message posted by the other user (hereinafter a user that follows other users will be referred to as a follower).

Amongst CRM (Customer Relationship Management) services provided as cloud services, there are examples in which a microblogging function to be used as a communication tool during work is provided. In these cloud services, client information, business discussion information, etcetera are linked to "messages" and "comments" in order to further improve the user's convenience of use. Furthermore, at the same time, in CRM services, file sharing functions are provided in which files are shared between users, wherein the files can be saved, edited, updated, and referenced. An example of this is Chatter provided by Salesforce.com as a microblogging function. Document, File, etcetera are examples of file sharing functions. Also, a technique of performing communication via the above mentioned "timeline" and "follow" has been proposed (for example, Japanese Patent Laid-Open No. 2011-129009).

Conventionally, when a user wishes to follow another user, the user can follow the other user by performing follow registration. Also, a user that uses an apparatus such as an image forming apparatus can cause the apparatus to acquire a message that the user posted, by causing the apparatus to follow the user. In such a case, it becomes possible for to cause the apparatus to operate in accordance with messages that the user posts. However, there is no simple mechanism for a user that uses an apparatus to cause the apparatus to follow the user, conventionally, and the process is cumbersome.

SUMMARY OF THE INVENTION

An aspect of the present invention is to eliminate the above-mentioned problems with the conventional technology.

A feature of the present invention is to provide a technique in which an image forming apparatus can perform setting to follow a user upon the user performing user authentication on the image forming apparatus, and the user can easily execute a print using the image forming apparatus.

According to an aspect of the present invention, there is provided an image processing apparatus that communicates with a server that has a microblogging function, the image processing apparatus comprising an authentication unit configured to perform user authentication processing and a follow unit configured to follow a user authenticated by the user authentication processing in accordance with the user authentication processing by the authentication unit succeeding.

Further features and aspects of the present invention will become apparent from the following description of exemplary embodiments, with reference to the attached drawings.

BRIEF DESCRIPTION OF THE DRAWINGS

FIG. 11 is a flowchart for describing message analysis processing by the image forming apparatus according to the first embodiment of the present invention.

FIG. 12 is a view for explaining a print data management table for managing print data stored in a print data DB according to the first embodiment.

FIG. 13A is a view for illustrating an example of a command character string management table.

FIG. 13B is a view for illustrating an example of a parameter character string management table.

FIG. 14 is a view for showing an example of a UI for setting a user follow time period according to the second embodiment.

FIG. 15 is a view for showing an example of a UI for confirming whether or not a user is followed after the user authenticates.

FIG. 19A and FIG. 19B are views for explaining a precedence order by which a plurality of image forming apparatuses follow a user according to the third embodiment.

DESCRIPTION OF THE EMBODIMENTS

Embodiments of the present invention will be described hereinafter in detail, with reference to the accompanying drawings. Note that the following embodiments are not intended to limit the claims of the present invention, and that not all of the combinations of the aspects that are described according to the following embodiments are necessarily required with respect to the solution means of the present invention.

First Embodiment

In the first embodiment, when a user goes to the location of an image forming apparatus 101 upon which he or she wishes to print, and performs user authentication, the image forming apparatus 101 follows the user and monitors for messages and comments that the user made using a microblogging function. A case where the image forming apparatus 101 analyzes the user's messages and comments, and performs a print if there is a message including a print request will be explained.

Figure 1:
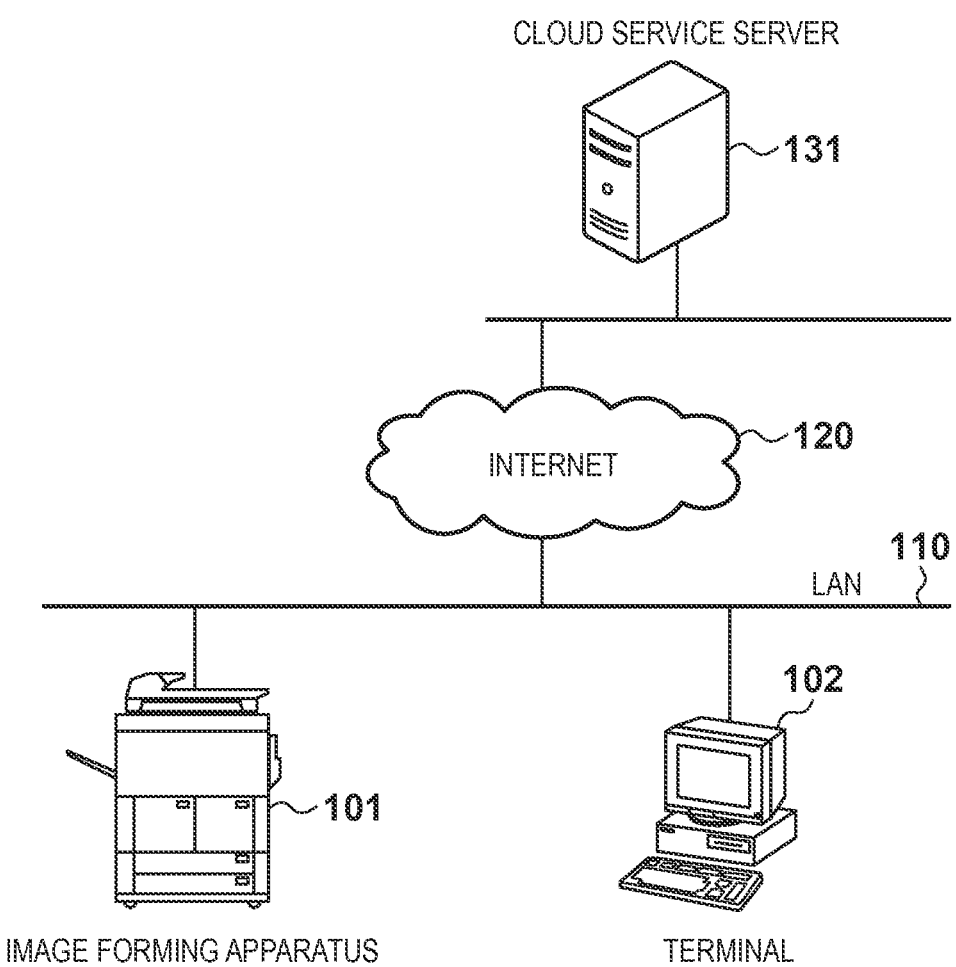
FIG. 1 is a view for showing an overall configuration of a print system according to a first embodiment.

FIG. 1 is a view for showing an overall configuration of a print system according to the first embodiment.

In this system, the image forming apparatus 101 and a terminal 102 are connected by a LAN 110. Also, the LAN 110 is connected to the Internet 120, and the LAN 110 is also connected to a microblogging function providing cloud service server 131 via the Internet 120. Here the terminal 102 is connected to the LAN 110, but the present invention is not limited to this, and it is enough that the terminal 102 can connect to the cloud service server 131.

Figure 2:
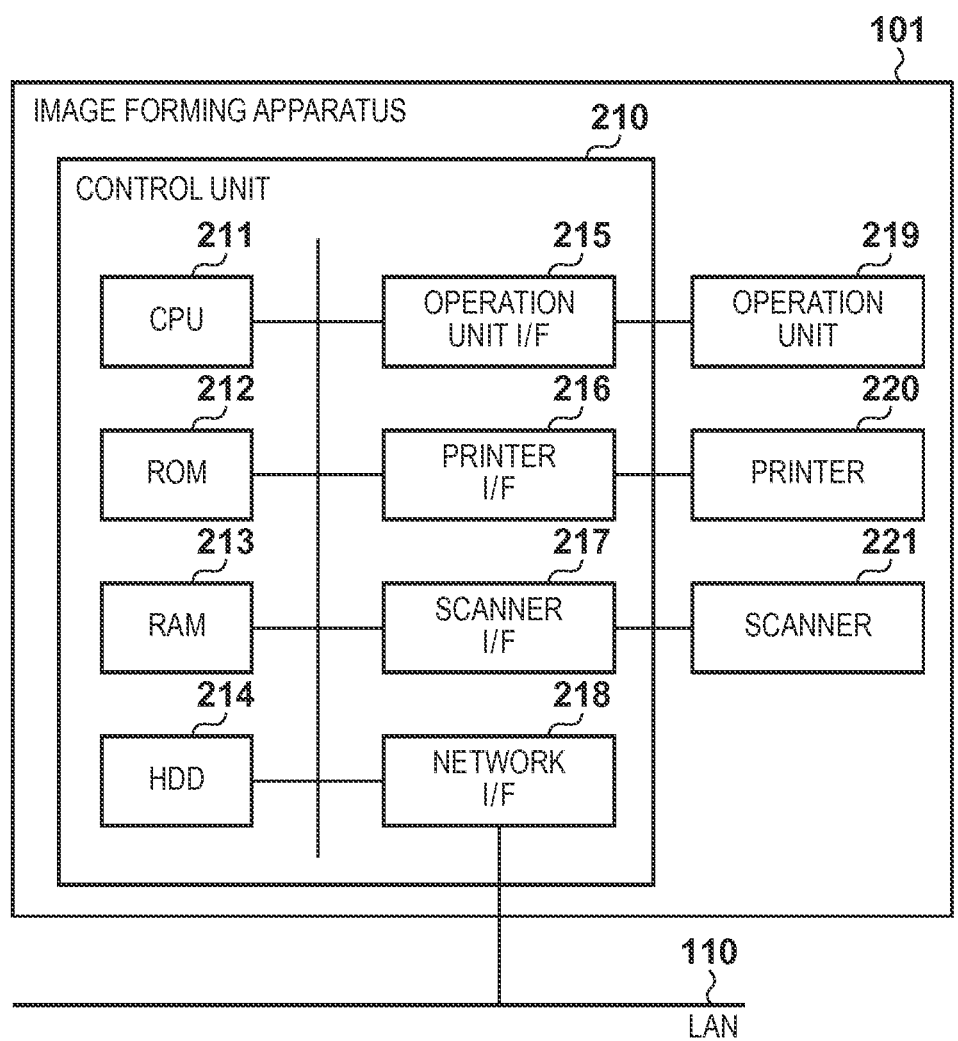
FIG. 2 is a block diagram for showing a hardware configuration of an image forming apparatus according to the first embodiment.

FIG. 2 is a block diagram for showing a hardware configuration of the image forming apparatus 101 according to the first embodiment.

The image forming apparatus 101 exemplifies an example of a multifunction peripheral having a print function, a scan function and the like. The image forming apparatus 101 provides, as a hardware configuration, a control unit 210, an operation unit 219, a printer 220 and a scanner 221. The control unit 210 comprises a CPU 211, a ROM 212, a RAM 213, an HDD 214, an operation unit I/F 215, a printer I/F 216, a scanner I/F 217 and a network I/F 218. The control unit 210, which includes the CPU 211, controls operation of the image forming apparatus 101 on the whole. The CPU 211 performs various control such as control of scanning of an original by the scanner 221 and control of transmission of image data to the LAN 110 and control of printing using the printer 220 according to control programs loaded into the RAM 213 by a boot program in the ROM 212. The ROM 212 stores such things as the boot program executed when the image forming apparatus 101 starts up and various settings. The RAM 213 is used as a temporary storage area such as a main memory and as a work area for the CPU 211.

The HDD 214 has on it installed an OS, and various programs for executing processing described with reference to the later explained flowcharts, and stores image data read in by the scanner 221, image data, and various information tables. The operation unit I/F 215 controls an interface between the operation unit 219 and the control unit 210. The operation unit 219 has an LCD unit (a display unit) having a touch panel function, a keyboard, or the like, and may also comprise a user authentication unit, or the like, for accepting user authentication when user authentication is performed with a card or the like. The printer I/F 216 connects the printer 220 and the control unit 210. Image data to be printed on the printer 220 is transferred to the printer 220 from the control unit 210 via the printer I/F 216, and printed by the printer 220 onto a recording medium (a sheet). The scanner I/F 217 connects the scanner 221 and the control unit 210. The scanner 221 reads in an image of an original, generates image data, and inputs it into the control unit 210 via the scanner I/F 217. The network I/F 218 connects the control unit 210 (the image forming apparatus 101) to the LAN 110. The network I/F 218 exchanges image data and various information via the terminal 102 on the LAN 110 and the Internet 120 with the cloud service server 131.

Figure 3:
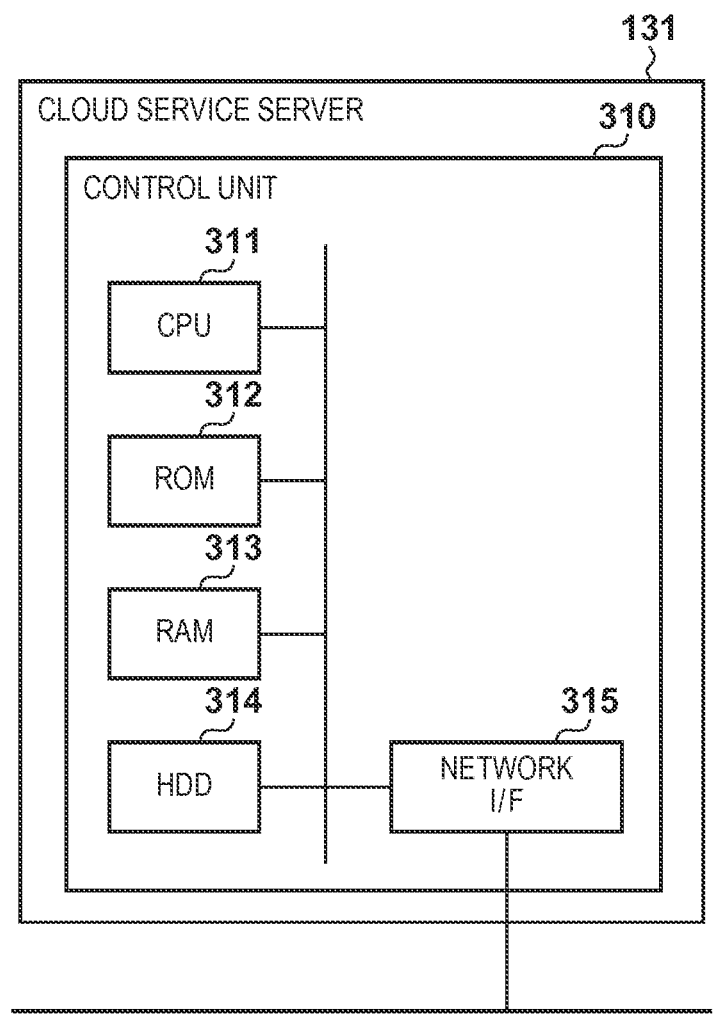
FIG. 3 is a block diagram for showing a configuration of a cloud service server according to the first embodiment.

FIG. 3 is a block diagram for showing a configuration of the cloud service server 131 according to the first embodiment.

A control unit 310, including a CPU 311, controls operation of the cloud service server 131 on the whole. The CPU 311 executes various control processing according to a control program loaded into a RAM 313 by a boot program in a ROM 312. The RAM 313 is used as a main memory, a work area, or the like of the CPU 311. The HDD 314 has on it installed an OS, various programs, and the like, and these programs are loaded into the RAM 313 by the boot program in the ROM 312. Also, the HDD 314 stores image data and various kinds of later explained information tables, and the like. A network I/F 315 connects the control unit 310 (the cloud service server 131) to the Internet 120. Also, the network I/F 315 transmits and receives various information via the Internet 120 with other apparatuses on the LAN 110. Note, the configuration of the terminal 102 is the same as the configuration of the cloud service server 131 explained in FIG. 3.

Figure 4:
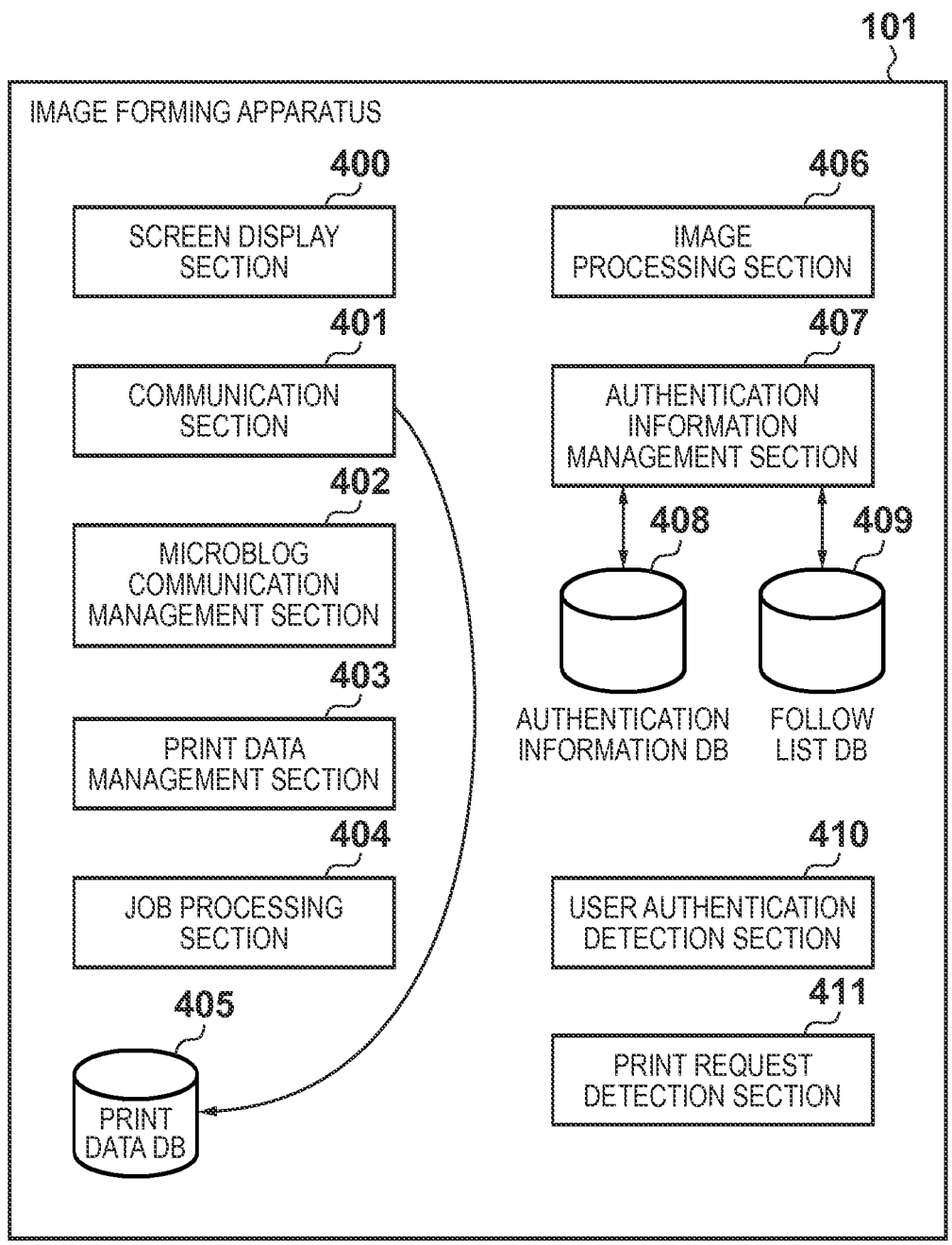
FIG. 4 is a block diagram for explaining a software configuration of the image forming apparatus according to the first embodiment.

FIG. 4 is a block diagram for explaining a software configuration of the image forming apparatus 101 according to the first embodiment. The various functional sections shown in FIG. 4 are realized by the CPU 211 of the image forming apparatus 101 executing a control program loaded into the RAM 213.

The image forming apparatus 101 comprises an screen display section 400, a communication section 401, a microblog communication management section 402, a print data management section 403, a job processing section 404, a print data database 405, an image processing section 406, and an authentication information management section 407. Also, the image forming apparatus 101 further comprises an authentication information database 408, a follow list database 409, a user authentication detection section 410, and a print request detection section 411. Note, hereinafter the print data database 405, authentication information database 408 and the follow list database 409 will be abbreviated to the print data DB 405, the authentication information DB 408 and the follow list DB 409 respectively.

The user authentication detection section 410 detects user authentication operation and notifies the authentication information management section 407. Next, the authentication information management section 407 determines whether or not the user has usage permission for the image forming apparatus 101 by referencing the authentication information DB 408 and determining whether user information of the user is registered in the authentication information DB 408. The authentication information management section 407 determines that the user has usage permission (the user authentication succeeded) the user is added to the follow list DB 409 as a followed user.

The communication section 401 adds the user to be followed to the cloud service server 131 according to an instruction of the microblog communication management section 402, and displays in notification messages and comments that were input on the Web page of the image forming apparatus 101. Also, the communication section 401 transmits a request to the cloud service server 131 according to an instruction from the microblog communication management section 402. Messages of the followed user are displayed on the Web page of the image forming apparatus 101 and the communication section 401 receives the messages from the cloud service server 131.

The print request detection section 411 determines the print data storage location by searching for a message including a print request from out of the received messages, and notifies the print data management section 403. The print data management section 403 instructs the communication section 401 to acquire print data. With this the communication section 401 acquires print data from a location of the cloud service server 131, stores it in the print data DB 405, and notifies the job processing section 404 that the print data has been stored. The job processing section 404 performs print processing based on the print data stored in the print data DB 405.

Here, the screen display section 400 may display a screen for executing a print operation to the operation unit 210, make a request for an update in image processing, or the like, to the image processing section 406, according to an instruction from the user if necessary, and make a print job execution instruction to the job processing section 404. For example, the image processing section 406 accepts color processing and edge emphasis specification and update, as well as screen specification and update, and processes image data. After the print concludes, the screen display section 400 displays the print completed.

Figure 5:
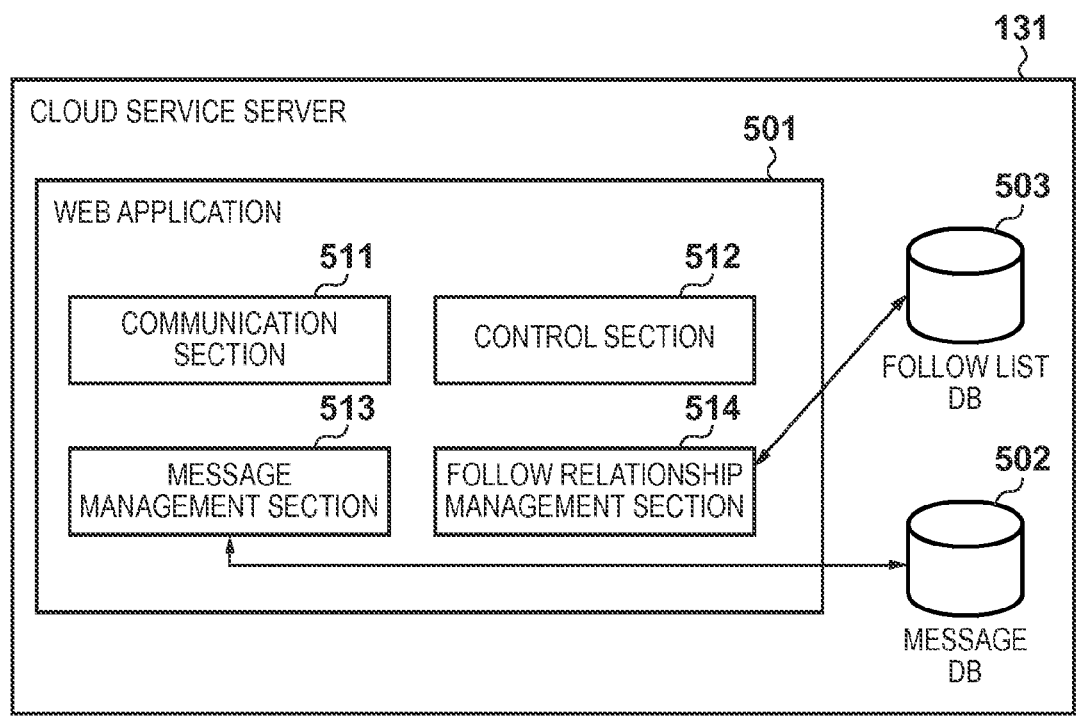
FIG. 5 is a block diagram for explaining a software configuration of the cloud service server according to the first embodiment.

FIG. 5 is a block diagram for explaining a software configuration of the cloud service server 131 according to the first embodiment. The various functional sections shown in FIG. 5 are realized by the CPU 311 of the cloud service server 131 executing a control program.

The cloud service server 131 comprises a Web application 501, a message database 502 (hereinafter referred to as message DB 502), and a follow list database (follow list DB 503).

The Web application 501 is a Web application for providing a CRM service or the like. In the first embodiment, the microblogging function is provided in the Web application 501. The Web application 501 comprises a communication section 511, a control section 512, a message management section 513 and a follow relationship management section 514.

The communication section 511 receives a request from the image forming apparatus 101 or the terminal 102 (PC, etc.), and transmits that request content to the control section 512. Furthermore, the communication section 511 receives a processing result for the request from the control section 512, creates response data in response to the request, and transmits the response to the image forming apparatus 101 or the terminal 102.

The control section 512 extracts a message or comment included in the request according to the content of the request transmitted from the communication section 511 and makes a request to the message management section 513 for registration processing for the message or comment. The message management section 513 receives the message or comment transmitted from the control section 512 and stores it in the message DB 502. Also the message management section 513, upon request from the control section 512, acquires the message or comment registered in the message DB 502 from the message DB 502, and transmits it to the control section 512.

The follow relationship management section 514 manages the relationship of the followers and those who are followed. Specifically, when the image forming apparatus 101 receives a user authentication, the image forming apparatus 101 registers to follow the user, and notifies the communication section 511 of information of the user via the Internet. With this, the communication section 511 notifies the follow relationship management section 514 that the image forming apparatus 101 will follow the user, and the follow relationship management section 514 adds to the follow list DB 503 that the image forming apparatus 101 follows the user. With this the follow relationship is updated.

Also, in a case where the user follows the image forming apparatus 101, the user makes a request to the communication section 511 to follow the image forming apparatus 101 using the terminal 102 (PC etc.). With this, the communication section 511 notifies the follow relationship management section 514 that the user follows the image forming apparatus 101. In this way the follow relationship management section 514 adds to the follow list DB 503 that the user follows the image forming apparatus 101.

Figure 6:
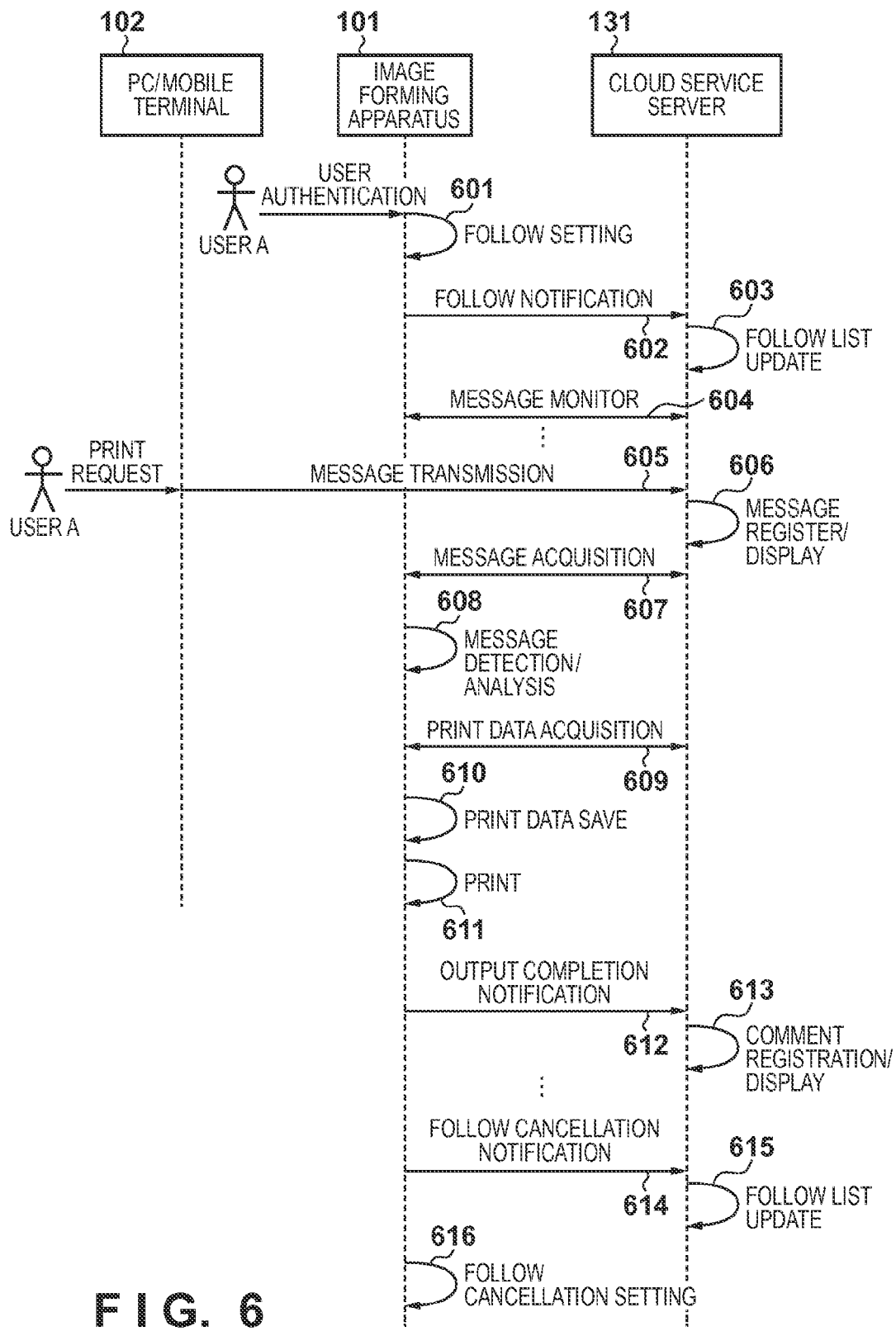
FIG. 6 is a sequence diagram for explaining a processing sequence that the image forming apparatus, a terminal and the cloud service server execute according to the first embodiment of the present invention.

FIG. 6 is a sequence diagram for explaining a processing sequence that the image forming apparatus 101, the terminal 102 and the cloud service server 131 execute according to the first embodiment of the present invention. Note, the details of the processing of the image forming apparatus 101 will be explained later with reference to the flowchart of FIG. 8.

In 601, the image forming apparatus 101 performs authentication of user A, and if user A is not a user that is being followed, the image forming apparatus 101 performs follow setting. Specifically, in a case where user A has usage permission, the authentication information management section 407 of the image forming apparatus 101 adds user A to the follow list DB 409 as a user that the image forming apparatus 101 follows. Next, in 602, the image forming apparatus 101 notifies the cloud service server 131 that it follows user A. With this, in 603, the cloud service server 131 updates the follow list of the follow list DB 409.

In 604, the image forming apparatus 101 starts to monitor for messages of the followed user A. Next, in 605, user A accesses the cloud service server 131 using a Web browser on the terminal 102 (PC, etc.) and transmits a message stating something to the effect of "please print two copies of PROJECT_Y-RESOURCE_MANAGEMENT.xls". With this, in 606, the cloud service server 131 receives the messages that user A transmitted, and registers them to the message DB 502.

In 607, the image forming apparatus 101 acquires messages of user A from the cloud service server 131. Next, in 608, the image forming apparatus 101 determines from the content of the messages acquired in 607 whether or not the messages include print request text, and if a message does include a print request it is analyzed, and the storage location of the print data is acquired. Next, in 609, the image forming apparatus 101 acquires print data from the storage location on the cloud service server 131 based on the analysis result (file acquisition). Here, the file "PROJECT_Y-RESOURCE_MANAGEMENT.xls" is acquired. Next, in 610, the image forming apparatus 101 saves the print data acquired in 609 in the print data DB 405. Next, in 611, the image forming apparatus 101 prints two copies of the print data stored in the print data DB 405 in 610 according to the message. Next, in 612, the image forming apparatus 101 transmits a comment stating to the effect of "printing completed" to the cloud service server 131. Next, in 613, the cloud service server 131 receives the message that the image forming apparatus 101 transmitted, and along with registering the message to the message DB 502, it also displays the message on the Web page.

As explained above, based on a message of user A that the image forming apparatus 101 is following, it is possible to execute a print of a document instructed in the message.

Note, numerals 614 through 616 show processing for a case where the image forming apparatus 101 cancels the following of user A.

In numeral 614, when a follow validity period expires, or when follow cancellation operation is performed on the image forming apparatus 101, the image forming apparatus 101 notifies the cloud service server 131 of the follow cancellation. With this, in numeral 615, the cloud service server 131 updates the follow list of the follow list DB 503. Next, in numeral 616, the image forming apparatus 101 performs cancellation of the follow. Specifically, the authentication information management section 407 of the image forming apparatus 101 deletes the user (user A in this case) registered in the follow list DB 409 as a followed user.

Figure 7:
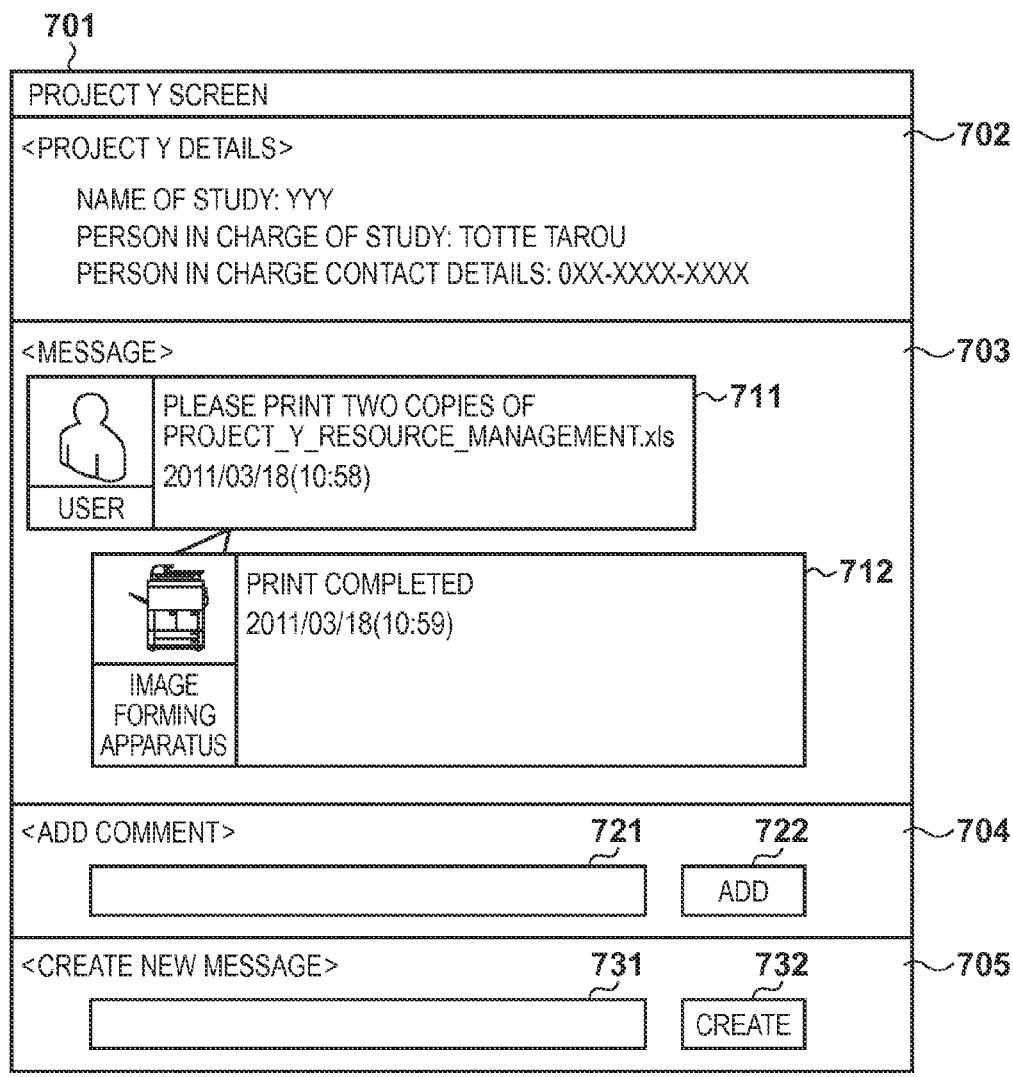
FIG. 7 is a view for explaining a microblogging function provided by the cloud service server according to the first embodiment of the present invention.

FIG. 7 is a view for explaining a microblogging function provided by the cloud service server 131 according to the first embodiment of the present invention. FIG. 7 shows an example of a Web page displayed on the terminal 102 by accessing the cloud service server 131 from a Web browser operating on the terminal 102 such as a PC or a mobile terminal. Here, the cloud service server 131 is managing a currently in progress project for the purpose of development support.

Numeral 701 shows an example display of a project Y screen that displays information relating to the currently in progress project. The project details area 702 is showing information related to this project Y such as the study name, the study person in charge, and the study person in charge contact details. The message display area 703 displays messages and timelines comprising comments to the messages.

In the message display area 703, the user has registered a message 711 that states, "please print two copies of PROJECT_Y-RESOURCE_MANAGEMENT.xls". It can be seen that next, in response to the message 711, the image forming apparatus 101 has registered a comment 712 that states, "print completed". Here, the image forming apparatus 101 is in a relationship where it is following the user. When a user goes to the location of the image forming apparatus 101 and makes a setting so that the user be followed, the image forming apparatus 101 will then follow that user. Next, the image forming apparatus 101 notifies the cloud service server 131 that it will follow the user. With this, the image forming apparatus 101 become able to display the message 711 that the user posted on the Web page of the image forming apparatus 101. Next, by analyzing the message 711 that the user posted, the image forming apparatus 101 can determine whether or not the message of the user is a print request.

It is assumed that the text of the message 711 stating, "PROJECT_Y-RESOURCE_MANAGEMENT.xls" comprises the storage location of the print data or information of a link thereto. The print data storage location in this case may be the cloud service server 131, an external server or the like. Accordingly, the image forming apparatus 101 can acquire print target print data (a file) from the storage location. Here, the print target file is an Excel (registered trademark) file, but the file may be an Adobe PDF (registered trademark), a Word (registered trademark) file or the like.

When the user inputs a comment into a comment input field 721 in a comment input area 704 and presses an add button 722, a comment add request is transmitted from the Web browser to the cloud service server 131. The cloud service server 131, having received this comment add request, registers the comment input into the comment add field 721 in the message DB 502. With this, when the user accesses the cloud service server 131 on a Web browser, the registered comment is displayed on the Web browser as with the previously described comment 712.

When the user input a message into a message input field 731 in a message input area 705, and presses a create button 732, a message create request is transmitted from the Web browser to the cloud service server 131. The cloud service server 131, having received this message create request, registers the input message in the message DB 502. With this, when the user accesses the cloud service server 131 on a Web browser, the created message is displayed on the Web browser as with the previously described message 711.

Figure 8:
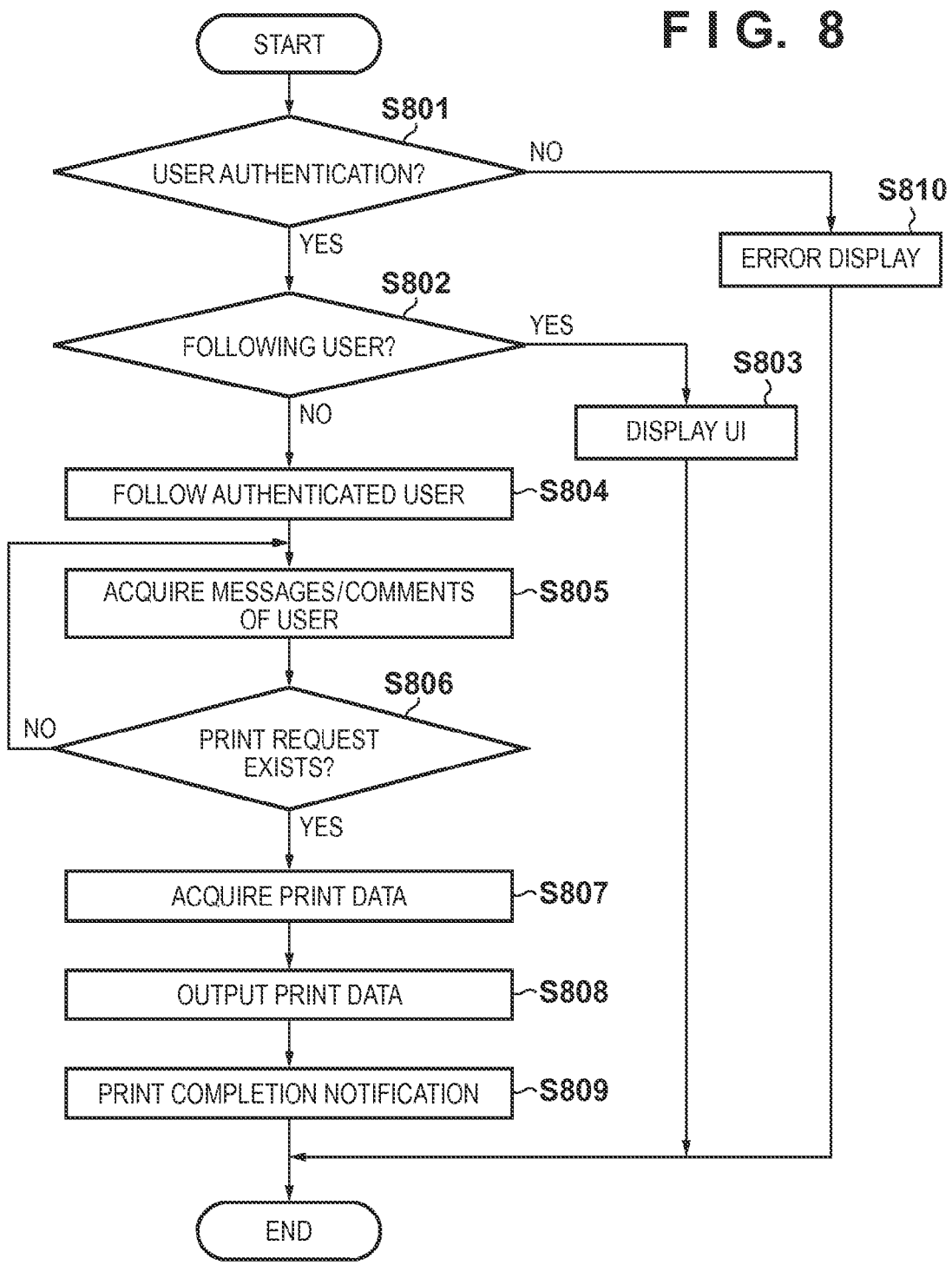
FIG. 8 is a flowchart for describing processing by the image forming apparatus according to the first embodiment.

FIG. 8 is a flowchart for describing processing by the image forming apparatus 101 according to the first embodiment of the present invention. Note, the program that executes this processing is installed in the HDD 214, loaded into the RAM 213 at execution time, and executed under the control of the CPU 211.

In step S801, the CPU 211 performs user authentication. Specifically, the user authentication detection section 410 of the image forming apparatus 101 notifies the authentication information management section 407 that user authentication operation was detected. The authentication information management section 407 determines whether or not the user has usage permission for the image forming apparatus 101 by comparing input user information against the authentication information DB 408 (whether or not user authentication succeeded). If the result of the determination is that the user is not registered in the authentication information DB 408, it is determined that user authentication failed, and the processing proceeds to step S810, and if the user is registered, the processing proceeds to step S802. In step S810 the CPU 211 displays an error. Specifically the screen display section 400 of the image forming apparatus 101 displays that there is a user authentication error, performs display of to the effect of "please notify the administrator" and completes the processing.

On the other hand, in step S802, the CPU 211 determines whether the user is a user that the image forming apparatus 101 is following. Specifically, the authentication information management section 407 of the image forming apparatus 101 references the follow list DB 409 and determines whether or not the authenticated user is registered in the follow list DB 409. If the result of the determination is that the user is not registered in the follow list DB 409 and thus is not followed, the processing proceeds to step S804, and if the user is followed, the processing proceeds to step S803. In step S803, it is determined that the purpose of the user authentication is to perform transmission of copy or scan data, a corresponding UI is displayed, and the processing completes.

In step S804, the CPU 211 follows the authenticated user. Specifically, the authentication information management section 407 of the image forming apparatus 101 follows the authenticated user and registers the user in the follow list DB 409. Next, the processing proceeds to step S805, and the CPU 211 monitors for messages or comments of the followed user. Specifically, the communication section 401 of the image forming apparatus 101 transmits a request to the cloud service server 131 requesting the user's messages and comment according to an instruction by the microblog communication management section 402. Here, the messages of the followed user are displayed on a Web page of the image forming apparatus 101, and the communication section 401 receives the messages. Next, the processing proceeds to step S806, and the CPU 211 searches for a print request message from among the messages of the user received in step S805. Specifically, the print request detection section 411 of the image forming apparatus 101 searches for a message including a print request. Here, if there is no message including a print request amongst the messages, the processing proceeds to step S805, and monitoring for messages of the user continues.

If there is a message including the print request, the processing proceeds to step S807, and the CPU 211 acquires print data from a location on the cloud service server 131 in which the user stored the print data. Specifically, the print request detection section 411 of the image forming apparatus 101 determines the storage location of the user's print data, and notifies the print data management section 403. The print data management section 403 instructs the communication section 401 to acquire the print data, specifying the storage location, and the communication section 401 acquires the print data from the location in which it was stored by the user, and stores it in the print data DB 405. Next, the print data management section 403 notifies the job processing section 404 that the print data is stored.

FIG. 12 is a view illustrating an example of a print data management table for managing print data stored in a print data DB 405 according to the first embodiment. This print data management table is generated and managed by the print data management section 403.

A print ID 1201 is an identifier of the print data and does not overlap in the print data management table. A print name 1202 stores a character string indicating a name of a document file of the print target included in the message that includes the print request that is analyzed in step S802. Also, the user ID 1203 is registered based on the user that dispatched the message including the print request that is analyzed in step S802.

Next the processing proceeds to step S808 and the CPU 211 prints by outputting the print data to the printer 220 via the printer I/F 216. Specifically, the job processing section 404 prints print data stored in the print data DB 405. Next, the processing proceeds to step S809, and the CPU 211 notifies the cloud service server 131 of print completion and also displays a UI. Specifically, the job processing section 404 notifies the microblog communication management section 402 that print completed. Next, the communication section 401 instructs the cloud service server 131 to make a print output notification in accordance with an instruction from the microblog communication management section 402 and also the screen display section 400 displays the print completed.

In this way the image forming apparatus 101 according to the first embodiment, when a user following the image forming apparatus 101 dispatches a message requesting a print, can acquire print data that the user registered on a server and print in accordance with the message.

Figure 10:
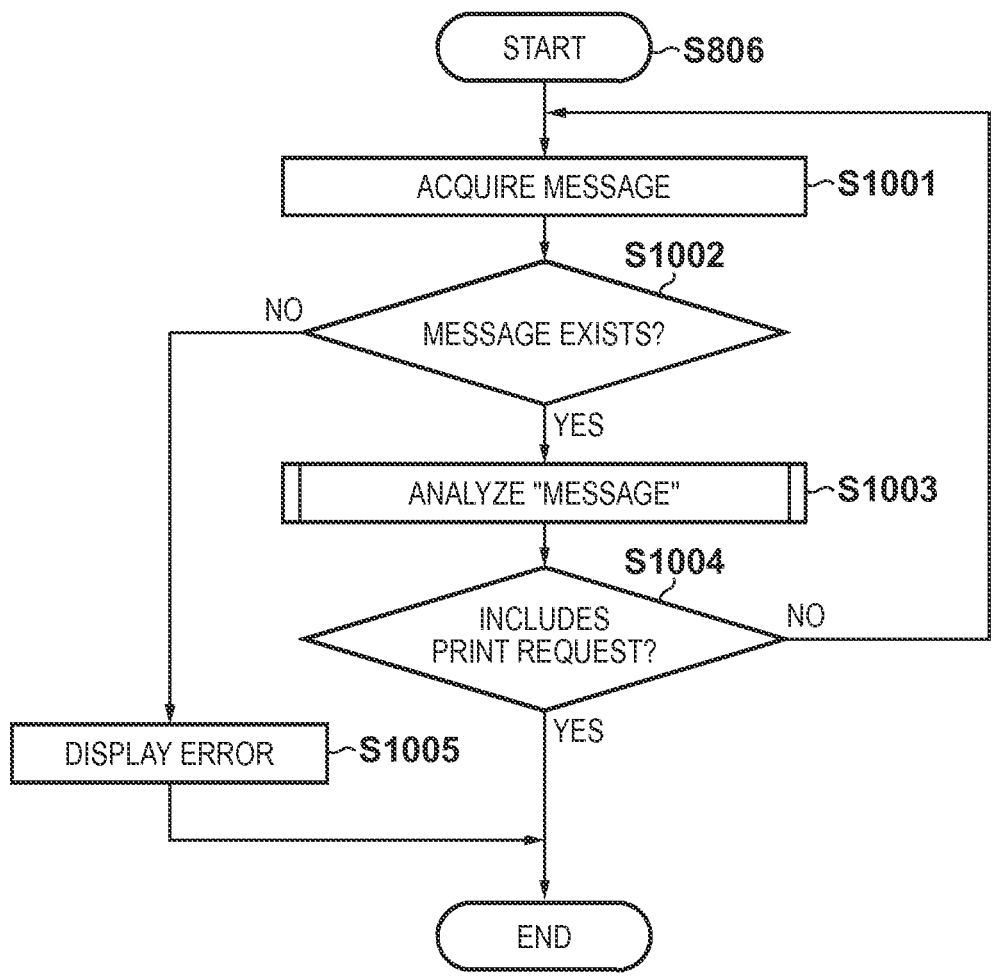
FIG. 10 is a flowchart for describing the details of search processing for the searching of a message including a print request by the image forming apparatus according to the first embodiment.

FIG. 10 is a flowchart for describing the details of search processing (step S806) for the searching of a message including a print request by the image forming apparatus 101 according to the first embodiment of the present invention.

Firstly, in step S1001, the microblog communication management section 402 acquires a message from the cloud service server 131 via the communication section 401. Here, a single message is acquired from amongst a plurality of messages. Next, the processing proceeds to step S1002, and determination is made as to whether or not a new message was added. In a case where a new message exists, the processing proceeds to step S1003, and in a case where a new message does not exist, the processing proceeds to step S1005, and error display is performed. In step S1005, the microblog communication management section 402 outputs an error log and the processing completes. In step S1003, the contents of the message acquired in step S1002 are analyzed, and it is determined whether or not the message includes a print request. This message analysis processing will be explained in detail later with reference to FIG. 11. Next, the processing proceeds to step S1004, and determination is made as to whether or not the message includes a print request command based on the analysis processing of step S1003 was that. If the message includes a print request processing completes, but if the message does not include a print request, the processing proceeds to step S1001.

FIG. 11 is a flowchart for describing the details of message analysis processing of step S1003 of FIG. 10 by the image forming apparatus 101 according to the first embodiment of the present invention. FIG. 13A is a view for illustrating an example of a command character string management table and FIG. 13B shows a view illustrating an example of a parameter character string management table.

In the flowchart of FIG. 11, the microblog communication management section 402 analyzes the message read out in step S1002 of FIG. 10. The message may be, for example, described in the following format.

"Please print two copies of PROJECT_Y-RESOURCE_MANAGEMENT.xls". The microblog communication management section 402 determines whether or not a print request command is included in the message, and furthermore, it determines the print data that is the target of the print request, and settings such as the storage location, and the number of copies to print.

Firstly in step S1101, the microblog communication management section 402 searches the acquired message for a character string indicating of a command character string 1301 command of a command character string management table shown in FIG. 13A. Next, the processing proceeds to step S1102 and determination is made as to whether or not a character string indicating the command is included in the message based on the search result of step S1101. In a case where in step S1102 a character string indicating a command is found, the processing proceeds to step S1103, and in a case where such a character string is not found, the present flow completes in error because the comment cannot be processed.

In the case of the aforementioned message, because the command character string "print" is included, the processing function 1302 of the command "print" can be determined to be a "print function" from the command character string management table of FIG. 13A. In a case where a character string indicating a command is found in this way, in step S1103 the microblog communication management section 402 searches the message for a character string included in the parameter character string 1311 of the parameter character string management table of FIG. 13B. In step S1104, it is determined whether or not a character string indicating a parameter is included in the message based on the search result of step S1103. In a case where in step S1104 a character string indicating a parameter is found in the message, the processing proceeds to step S1105, and in a case where in step S1104, a character string indicating a parameter is not found in the message, the present flow completes because the comment cannot be processed. In the case of the aforementioned message, because "2 copies" can be found, it would be determined that a character string indicating a parameter is found, it can be determined that the "copies processing" is for 2 copies from the processing function 1312 corresponding to FIG. 13B.

In this way, by the processing of step S1102 and step S1104, it can be determined that the message is instructing that 2 copies of the document file "PROJECT_Y-RE-SOURCE_MANAGEMENT.xls" be processed for printing. Next, the processing proceeds to step S1105, and print data storage information is acquired. Accordingly, in the case of the aforementioned message, in step S806 of FIG. 8 it would be determined to be a message that includes a print request command, the processing would proceed to step S807, and print data would be acquired from the cloud service server 131 based on the print data storage information acquired in step S1105 of FIG. 11.

As explained above, by the first embodiment when a user performs authentication on the image forming apparatus 101 that a user wishes to use the image forming apparatus 101 can set that the user to be followed. As a result of this, the image forming apparatus 101 monitors for microblogging function messages of the followed user and print can be carried out for the print data that the user registered according to the message.

Note, in step S805 of FIG. 8, the time interval that message querying to the cloud service server 131 is performed from the CPU 211 may be adjusted in accordance with the number or users that the image forming apparatus 101 follows and the usage frequency of the followed users. By doing this, the image forming apparatus 101 may adjust the load from monitoring for messages.

Also, after the user authentication of step S801, the CPU 211 displays text stating, "follow the user?" on the UI as shown in FIG. 15. Here, when the user presses a "YES" button 1501, the processing proceeds to step S804, and the user may be set to be followed. Note, this UI is displayed by the screen display section 400 of the image forming apparatus 101. With this, the image forming apparatus 101 can inform the user that it will follow the user, and it can allow confirmation. Furthermore, regarding the address of the cloud service server 131, it is desirable that the company and work section be set in advance, but the user may also input these at this time.

Second Embodiment

Meanwhile, there is a possibility that in an office, users execute printing using different image forming apparatuses. For this reason, it is beneficial to restrict the time that an image forming apparatus 101 follows a user. For example, when a user that happens to performs a job close to an image forming apparatus 101 set up in a particular location performs authentication on the image forming apparatus 101, the image forming apparatus 101 only follows the user for the day. By doing this, the image forming apparatus 101 only needs to follow users that authenticated on the day, and so this leads to a reduction in the message monitoring load of the image forming apparatus 101. Also, the image forming apparatus 101 can avoid a situation in which the number of users it follows increases and increases.

So, in the second embodiment, explanation will be given for a case where the image forming apparatus 101 set a validity period for following a user, and when that validity period has passed cancels the follow relationship. Note, in the second embodiment, only parts that differ from the first embodiment will be explained, and because the method of searching messages and comments and the method of analyzing are the same as in the first embodiment, they will not be described here. Also, the system configuration and the configurations of the image forming apparatus 101, the terminal 102 and the cloud service server 131 are the same as in the first embodiment and the explanation will be omitted.

Here, in the previously explained numeral 601 of FIG. 6, the CPU 211 performs setting of a follow of a user that authenticated. In other words, the screen display section 400 displays a UI screen as shown in FIG. 14. Here, a desired validity period for following is selected by the user out of "TODAY ONLY" 1401, "UNTIL TOMORROW" 1402 and "UNTIL THE DAY AFTER TOMORROW" 1403. Of course, configuration may be made so that the user can input the validity period that the user desires itself. From numerals 602 through 613 in FIG. 6, there is no difference with the first embodiment and so explanation is omitted.

Figure 9:
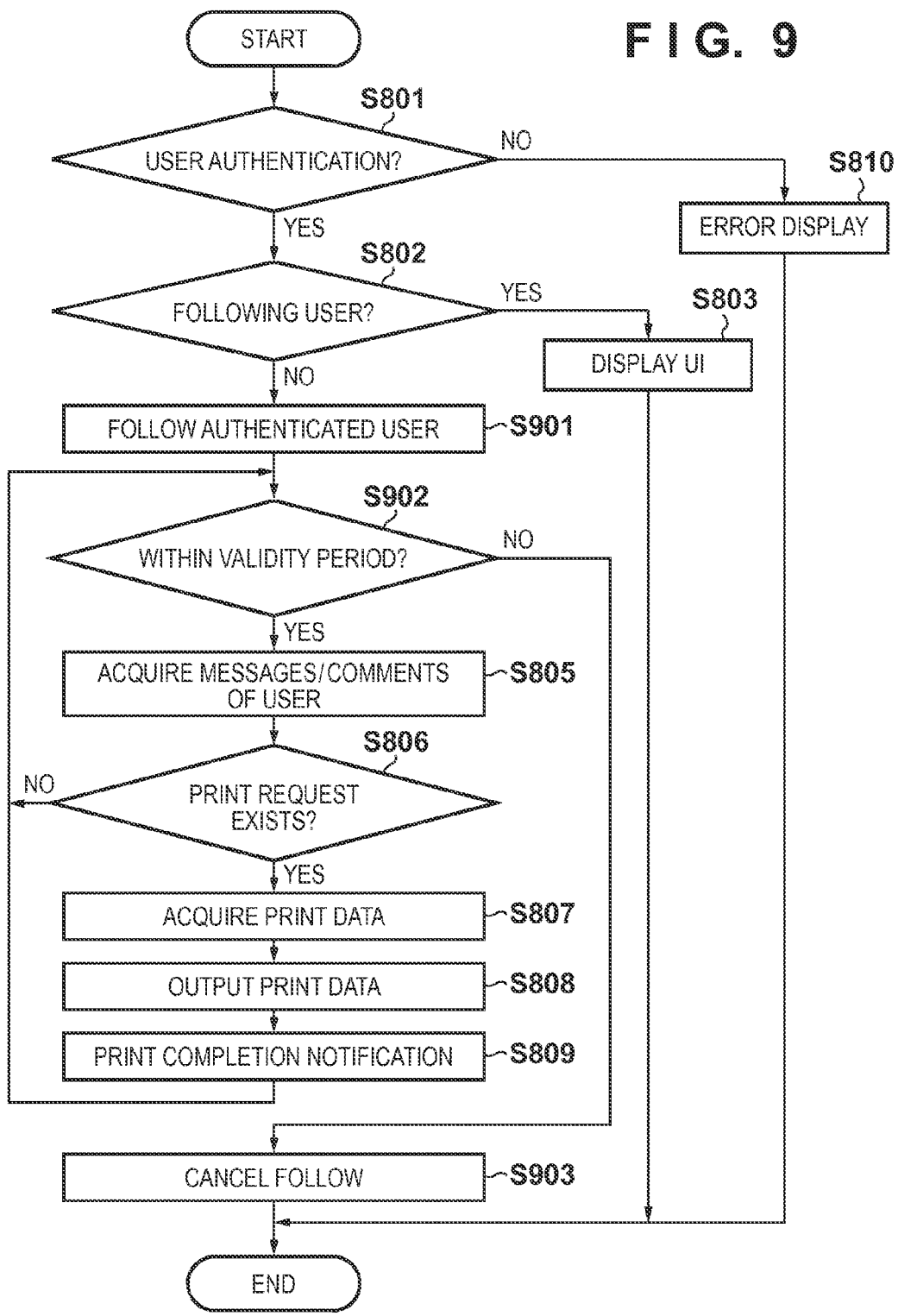
FIG. 9 is a flowchart for describing processing by the image forming apparatus according to a second embodiment of the present invention.

FIG. 9 is a flowchart for explaining processing by the image forming apparatus 101 according to the second embodiment of the present invention. Note, a program that executes this processing is installed in the HDD 214, and when executed this program is loaded into the RAM 213 and executed under the control of the CPU 211. In FIG. 9, steps that execute the same processing as in the previously explained FIG. 8 are denoted with the same numerals, and explanation of these is omitted.

In step S901, the CPU 211 sets so that the user that authenticated is followed. Here, a point of difference with step S804 of the previously explained FIG. 8 is that the screen display section 400 of the image forming apparatus 101 displays a UI shown in FIG. 14 and the user is enabled to set the validity period that the user will be followed. Next, the processing proceeds to step S902 and the CPU 211 determines whether or not it is currently within the validity period of the followed user. If it is currently within the validity period of the followed user, the processing proceeds to step S805 and if the validity period has passed the processing proceeds to step S903. From steps S805 through S809, there is no difference with the first embodiment and so explanation is omitted. In step S903, the CPU 211 performs cancellation of the follow. Specifically the follow is cancelled by notifying the cloud service server 131 of the follow cancellation. This is performed as in numerals 614 and 615 of FIG. 6.

Note, in step S903, a screen for querying the user whether or not to cancel the follow may be displayed by the screen display section 400, and cancellation of the follow may be performed in a case where the user accepts. With this, the occurrence of a situation in which the follow is cancelled when the user does not wish it and the user cannot request for print using a print request message without noticing can be avoided.

In this way, by the second embodiment, it is possible to limit the load of the image forming apparatus 101 by allowing the image forming apparatus 101 to set a validity period for following a user. The following of users that no longer use the image forming apparatus 101 can be made more infrequent, and an ever increasing number of followed users can be avoided.

Third Embodiment

In the first and second embodiments, explanation was made for a case where there was only a single image forming apparatus 101 that follows users. In contrast to this, in the third embodiment, explanation will be give where a plurality of image forming apparatuses 101 follow users. In the third embodiment, explanation will be given for a case in which a user uses two (an image forming apparatus 101A and an image forming apparatus 101B. Here, a precedence order is set for a plurality of image forming apparatuses 101 following a user, and the image forming apparatuses 101 performing processing in accordance with the precedence order for a print instruction, or the like from the user. With this, it is possible to avoid executing simultaneous printing by a plurality of image forming apparatuses 101 for a user print request.

In the third embodiment, a plurality of image forming apparatuses 101 are in a relationship in which they are following each other, and messages and comments from another image forming apparatus 101 can be seen on a Web page of each image forming apparatus 101. Also, the plurality of the image forming apparatus 101A and the image forming apparatus 101B have the same configurations. Also, the system configuration and the configurations of the image forming apparatus 101, the terminal 102 and the cloud service server 131 are the same as in the first embodiment and the explanation will be omitted.

In the third embodiment, when a user goes to the location of the image forming apparatus 101A and performs user authentication, setting is made so that the image forming apparatus 101A follows the user. Here, the image forming apparatus 101A notifies the cloud service server 131 that it follows the user. In this case, the image forming apparatus 101A becomes a follower having a precedence order of first amongst the plurality of image forming apparatuses 101. Next, the user goes to the location of the image forming apparatus 101B and sets so that the image forming apparatus 101B follows the user by performing user authentication. Here, the image forming apparatus 101B notifies the cloud service server 131 that it will follow the user. Here, the image forming apparatus 101B become first in the precedence order for following the user. Next, the image forming apparatus 101A refers to the follow notification by the image forming apparatus 101B and changes its precedence order for following the user to second.

Figure 18:
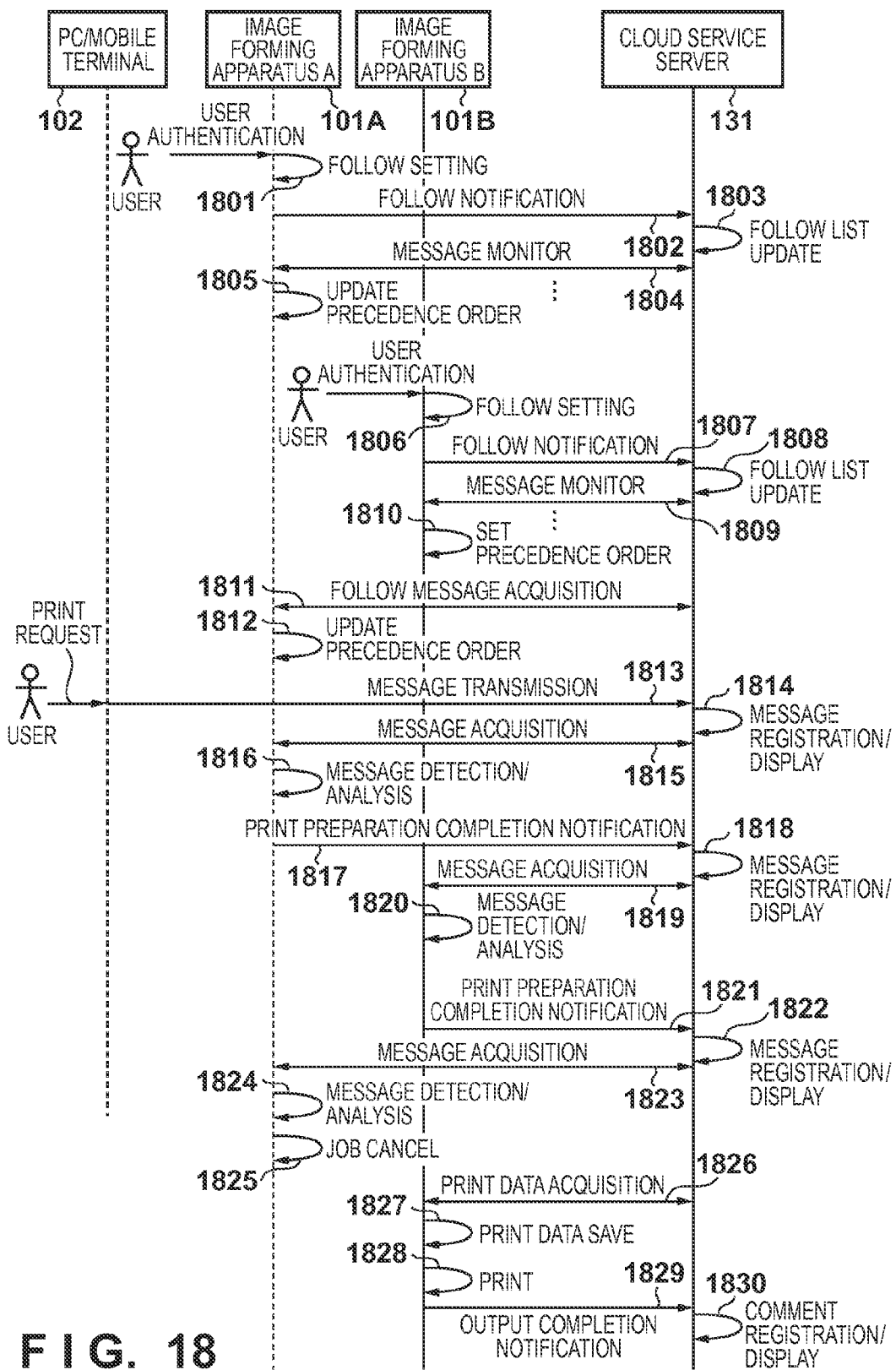
FIG. 18 is a sequence diagram for explaining a processing sequence that the terminal, the image forming apparatus, and the cloud service server execute according to the third embodiment.

FIG. 18 is a sequence diagram for explaining a processing sequence that the terminal 102, the image forming apparatuses 101A and 101B and the cloud service server 131 execute. Numerals 1801 through 1804 of FIG. 18 correspond to numerals 601 through 604 of FIG. 6 of the first embodiment and so explanation of these is omitted.

In numeral 1805, the image forming apparatus 101A sets its follow precedence order to be first and registers to the follow list DB 409 of the image forming apparatus 101A. Numerals 1806 through 1809 correspond to numerals 601 through 604 of FIG. 6 of the first embodiment and so explanation of these is omitted.

In numeral 1810, the image forming apparatus 101B sets its follow precedence order to be first and registers to the follow list DB 409 of the image forming apparatus 101B.

Next, in numeral 1811, the image forming apparatus 101A acquires a message that the image forming apparatus 101B followed the user. With this, in numeral 1812, the image forming apparatus 101A updates the follow list DB 409, and changes the follow preference order for that user to be second, and saves information for the fact that the image forming apparatus 101B has a follow preference ordering of first to the follow list DB 409.

Numeral 1813 corresponds to numeral 605 of FIG. 6, and numeral 1814 corresponds to numeral 606 of FIG. 6 and so explanation of these is omitted. Next, in numeral 1815, the image forming apparatus 101A acquires messages of the user it is following from the cloud service server 131. Next, in numeral 1816, the image forming apparatus 101A determines whether or not the message acquired in numeral 1815 included a print request, and when it does include a print request, the storage location of the print data is analyzed.

Next, in numeral 1817, in a case where the message of the user includes a print request, the image forming apparatus 101A notifies the cloud service server 131 that print preparation has been made. This may be, for example, the message shown in numeral 1601 of FIG. 16. In numeral 1818, the cloud service server 131 registers and displays the message transmitted from the image forming apparatus 101A in numeral 1817.

Next, in numeral 1819, the image forming apparatus 101B acquires the messages of the user from the cloud service server 131. In numeral 1820, the image forming apparatus 101B determines whether the message acquired in numeral 1819 includes a print request from its content, and if the message does include the print request, analyzes the storage location of the print data. Next, in numeral 1821, in a case where a user message includes the print request, the image forming apparatus 101B notifies the cloud service server 131 that print preparation has been made. This may be, for example, the message shown in numeral 1602 of FIG. 16. In numeral 1822, the cloud service server 131 registers and displays the message transmitted from the image forming apparatus 101B in numeral 1822.

Next, in numeral 1823, the image forming apparatus 101A acquires the message that the image forming apparatus 101B transmitted from the cloud service server 131. Next, in numeral 1824, the image forming apparatus 101A analyzes the message. Here, the image forming apparatus 101A can determine that the message is notifying that print preparation was made. The image forming apparatus 101A refers to the follow list DB 409 and determines whether or not the message is from the image forming apparatus 101B which has a higher priority. If the message is from the image forming apparatus 101B which has a higher priority, in numeral 1825, the image forming apparatus 101A cancels the print job prepared in numeral 1817. Specifically, as a result of the determination in numeral 1824, the image forming apparatus 101A can determine that the image forming apparatus 101B which has a preference ordering of first has completed print preparation and so it can leave the processing of the print that the user requested to the image forming apparatus 101B.

Numerals 1826 through 1830 are print processing by the image forming apparatus 101B and correspond to numerals 609 through 613 of FIG. 6 and so explanation of these is omitted.

Figure 16:
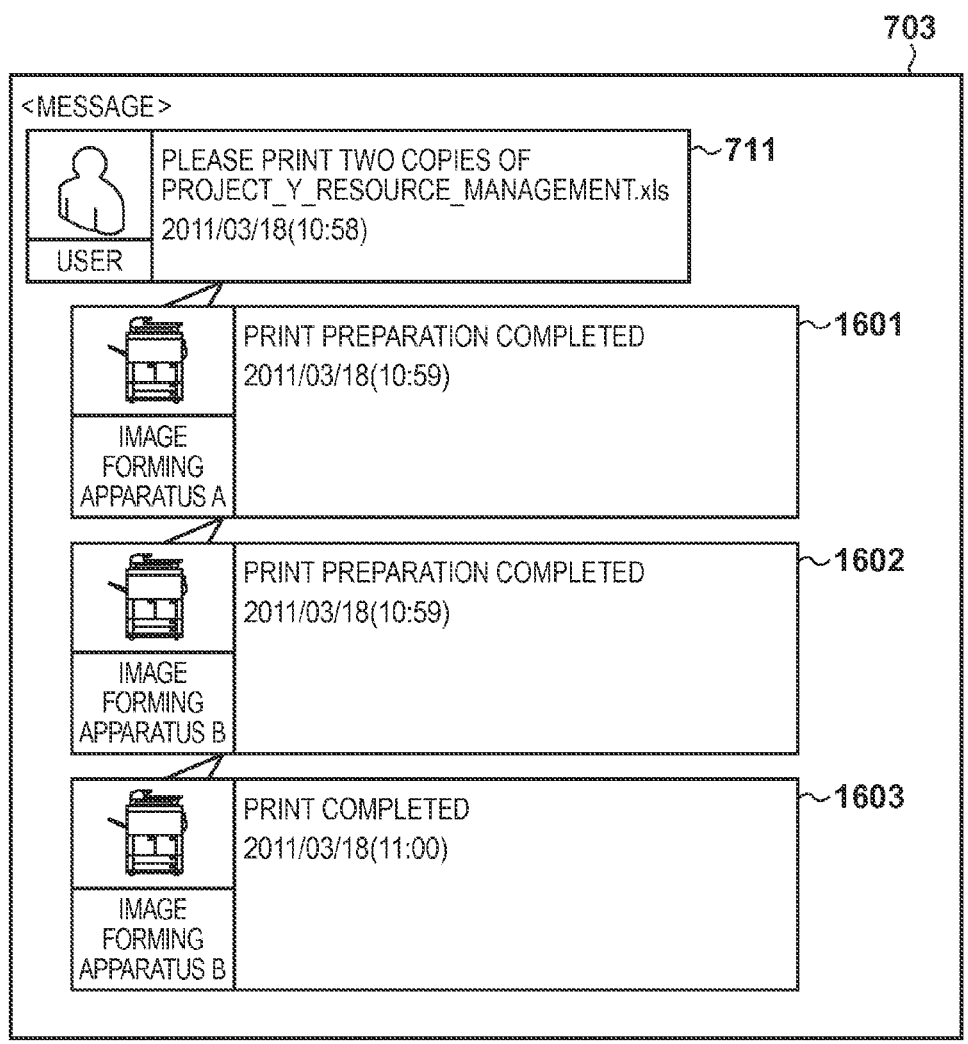
FIG. 16 is a view for explaining a microblogging function provided by the cloud service server according to a third embodiment.

FIG. 16 is a view for explaining a microblogging function provided by the cloud service server 131. Here, only an area corresponding to the message display area 703 of FIG. 7 is displayed.

Here, the user has registered a message 711 that states, "please print 2 copies of PROJECT_Y-RESOURCE_MANAGEMENT.xls". In response to this the image forming apparatus 101A has registered a message 1601 stating "print preparation completed". This is based on the message sent in notification from the image forming apparatus 101A in numeral 1817 of FIG. 18. After that, the image forming apparatus 101B registers a message 1602 stating "print preparation completed". This is based on the message sent in notification from the image forming apparatus 101B in numeral 1821 of FIG. 18. Finally, the image forming apparatus 101B executes a print and based on the message sent in notification from the image forming apparatus 101B in numeral 1829 registers a message 1603 stating "print completed".

Figure 17:
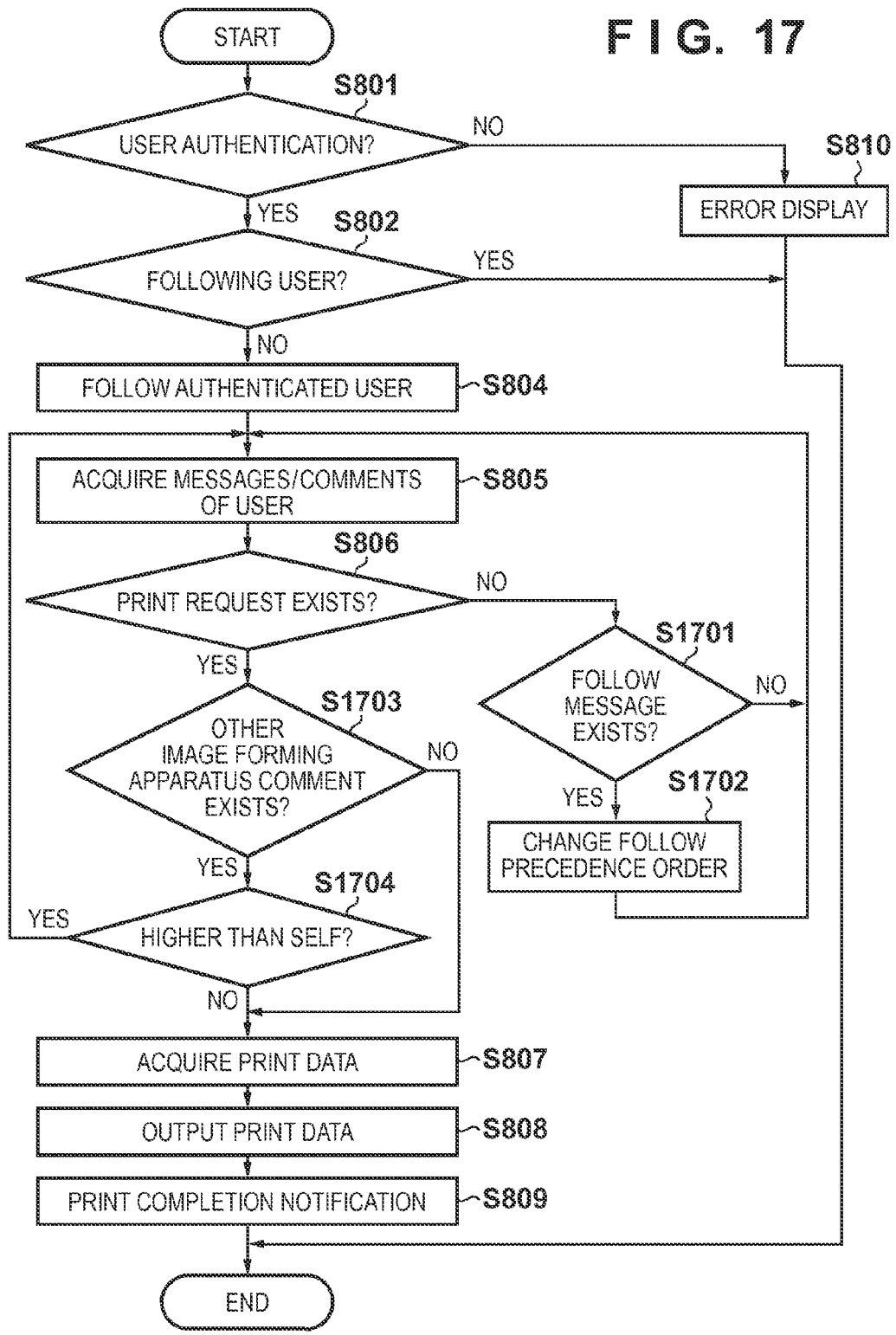
FIG. 17 is a flowchart for explaining processing by the image forming apparatus according to the third embodiment.

FIG. 17 is a flowchart for describing processing by the image forming apparatus 101 according to the third embodiment of the present invention. Note, the program that executes this processing is installed in the HDD 214, loaded into the RAM 213 at execution time, and executed under the control of the CPU 211. In FIG. 17, steps that execute the same processing as in the previously explained FIG. 8 are denoted with the same numerals, and explanation of these is omitted.

In step S804 the CPU 211 follows the user that authenticated. Specifically the authentication information management section 407 of the image forming apparatus 101 follows the user that authenticated, and the corresponding precedence order in the follow list DB 409 is registered as first. Steps S805 and S806 are the same as in the first embodiment. However, in step S806, when it is determined that a print request is not included in the acquired message, the processing proceeds to step S1701 and when a print request is included, the processing proceeds to step S1703. In step S1701, the CPU 211 determines whether or not there is a message that another image forming apparatus 101 follows the user, and if not, the processing proceeds to step S805, but if there is such a message, the processing proceeds to step S1702, the follow precedence order is changed, and the processing proceeds to step S805. Specifically, the authentication information management section 407 of the image forming apparatus 101A decrements the precedence order by 1, updates the follow list DB 409 and proceeds to step S805.

In step S1703, the CPU 211 determines whether or not there is a comment that another image forming apparatus 101 has done print preparation. Specifically, the print request detection section 411 of the image forming apparatus 101 searches for a comment of another image forming apparatus 101. If there is a comment of another image forming apparatus 101, the processing proceeds to step S1704, and if there is no comment of another image forming apparatus 101, the processing proceeds to step S807. In step S1704, the CPU 211 compare follow precedence order. Specifically, the authentication information management section 407 of the image forming apparatus 101 determines whether or not the precedence order of the other image forming apparatus 101 that did print preparation is higher or not than that of the image forming apparatus 101. If the other image forming apparatus 101 has a higher precedence order, print is not carried out and the processing proceeds to step S805, but if the other image forming apparatus 101 does not have a higher precedence order, the print processing is moved to step S807. The processing from step S807 through S809 is the same as in previously explained FIG. 8 and so explanation of this is omitted.

In the third embodiment, the precedence order of the image forming apparatus 101B that last performed follow setting for a user, is set to be first for the user. Also, other image forming apparatuses 101 that are following the user, analyze a message stating that another image forming apparatus 101 (the image forming apparatus 101B) performed follow setting for the user, and lower their precedence order for that user by 1. For example, in a case where the user performed authentication on another image forming apparatus 101C after the image forming apparatus 101B, the precedence order stored in the follow list DB 409 of the image forming apparatus 101B is updated as in FIG. 19B.

FIG. 19A and FIG. 19B are views for explaining a precedence order by which a plurality of image forming apparatuses follow a user according to the third embodiment.

FIG. 19A show a case in which when the image forming apparatus 101A and the image forming apparatus 101B exist, and after a user has performed authentication on the image forming apparatus 101A, the user performed authentication on the image forming apparatus 101B. In this case, the precedence order of the image forming apparatus 101B is the highest and is "1" and the precedence order of the image forming apparatus 101A is set to "2".

Furthermore, in FIG. 19B shows a case where after this, the same user performs authentication on the image forming apparatus 101C. In this case, the precedence order of the image forming apparatus 101C is the highest and is "1", next is the image forming apparatus 101B and ordered last is the image forming apparatus 101A.

Note, configuration may be taken in which information showing the precedence order of the image forming apparatus 101A does not exist in the list showing the precedence order stored in the follow list DB 409 of the image forming apparatus 101B. Regarding an image forming apparatus 101 for which there is no information related to the precedence order for a user, it is determined that such an image forming apparatus 101 has a lower precedence order for the user.

By using such a precedence order, it is possible to determine which image forming apparatus 101 will execute a print for a message including a print request from a user. For example, in the example of FIG. 19A, the image forming apparatus 101A can leave the requested print processing to the image forming apparatus 101B because it can determine that the precedence order of the image forming apparatus 101B is higher.

In the third embodiment, details are not described, but, for example, in numeral 1817 of FIG. 18, after the image forming apparatus 101A sends a print preparation completion message in notification, and there is no print preparation completion notification from an image forming apparatus 101B of a higher precedence order within a predetermined period of time. In this case, it is determined that the electric power of the image forming apparatus 101B with the higher precedence order than the image forming apparatus 101A is off, so the image forming apparatus 101A executes the requested print processing.

Thus, by the third embodiment, even in a case where the user has set to be followed by a plurality of image forming apparatuses 101, problems due to print processing being executed by a plurality of image forming apparatuses 101 can be solved. Also, because the precedence order is set without the user realizing it, the bother of user setting is reduced.

In the third embodiment, the image forming apparatus 101 that performs print processing amongst a plurality of image forming apparatuses 101 is determined in accordance with the precedence order, but, of course, configuration may be taken in which it is user specified.

In other words, in FIG. 16, when the image forming apparatus 101B sends the message 1602 in notification in response to the message 1601 from the image forming apparatus 101A, the user may comment "by image forming apparatus 101A". With this, the image forming apparatus 101A analyzes this comment, and regardless of the precedence order for the user, the image forming apparatus 101A prints, whereas the image forming apparatus 101B cancels the print job.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-184574, filed Aug. 23, 2012, which is hereby incorporated by reference herein in its entirety.

What is claimed is:

1. An image processing apparatus that communicates with a server that has a microblogging function, the image processing apparatus comprising:
   an authentication unit configured to perform user authentication processing;
   a follow unit configured to follow, in response to the user authentication processing by the authentication unit succeeding, a user authenticated by the user authentication processing;
   a message acquisition unit configured to acquire a message registered to the server by the user followed by the follow unit;
   an analysis unit configured to analyze the message acquired by the message acquisition unit; and
   a file acquisition unit configured to acquire a file specified by the message from the server based on a result of analyzing by the analysis unit.

2. The image processing apparatus according to claim 1, further comprising a print unit configured to print the file acquired by the file acquisition unit.

3. The image processing apparatus according to claim 1, further comprising:
   a setting unit configured to set a validity period for the follow unit to follow the user; and
   a cancellation unit configured to cancel a follow of the user by the follow unit, when the validity period set by the setting unit passes.

4. The image processing apparatus according to claim 1, further comprising a setting unit for setting a precedence order for the follow unit to follow the user in a case that a plurality of image processing apparatuses exist, wherein the file acquisition unit acquires from the server a file specified with a message of the user in a case where the precedence order for the follow unit to follow the user is a highest precedence value among the plurality of image processing apparatuses.

5. The image processing apparatus according to claim 4, wherein the precedence order for the follow unit to follow the user becomes the highest precedence value in a case that the authentication unit lastly performs the user authentication processing among the plurality of image processing apparatuses.

6. The image processing apparatus according to claim 1, wherein the analysis unit determines whether or not the message instructs a print based on a character string included in the message, and the file acquisition unit acquires a file specified by the message from the server in a case where the message instructs a print.

7. The image processing apparatus according to claim 1, wherein the follow unit further comprises a query unit configured to query the user authenticated by the authentication unit whether or not to follow the user authenticated by the authentication unit.

8. A control method of an image processing apparatus that communicates with a server that has a microblogging function, the control method comprising:
   performing user authentication processing;
   following, in response to the performing user authentication processing succeeding, a user authenticated by the user authentication processing;
   acquiring a message registered to the server by the followed user;
   analyzing the acquired message; and
   acquiring a file specified by the message from the server based on a result of analyzing of the acquired message.

9. A non-transitory computer-readable storage medium storing a program for causing a computer to function as the image processing apparatus according to claim 1.

* * * * *